United States Patent [19]
Amada

[11] Patent Number: 5,637,125
[45] Date of Patent: Jun. 10, 1997

[54] AIR FILTER ASSEMBLY FOR PNEUMATIC TOOL

[75] Inventor: Yoshiyuki Amada, Tokyo, Japan

[73] Assignee: Max Co., Ltd., Tokyo, Japan

[21] Appl. No.: 548,500

[22] Filed: Oct. 26, 1995

[30] Foreign Application Priority Data

Oct. 26, 1994 [JP] Japan .................................. 6-262781

[51] Int. Cl.⁶ .................................................. B01D 46/00
[52] U.S. Cl. .............................. 55/385.1; 55/503; 55/504; 55/505
[58] Field of Search ...................... 55/385.1, 503, 55/504, 505; 81/57.44, DIG. 12; 173/168, 169, 170; 227/130

[56] References Cited

U.S. PATENT DOCUMENTS

| 707,318 | 8/1902 | Geyer et al. | 55/503 |
|---|---|---|---|
| 1,103,306 | 7/1914 | Maher | 55/503 |
| 1,724,733 | 8/1929 | Schuller | 55/503 |
| 1,839,379 | 1/1932 | Downing | 55/503 |
| 1,888,150 | 11/1932 | Walker | 55/503 |
| 2,068,858 | 1/1937 | Jones | 55/503 |
| 2,792,073 | 5/1957 | Boss | 55/503 |
| 3,557,536 | 1/1971 | Ririe | 55/504 |
| 3,681,899 | 8/1972 | Grote | 55/503 |
| 4,810,272 | 3/1989 | Overby | 55/505 |
| 5,259,465 | 11/1993 | Mukoyama | 173/168 |
| 5,522,910 | 6/1996 | Fogal, Sr. | 55/505 |

FOREIGN PATENT DOCUMENTS

| 539562 | 7/1955 | Belgium | 55/503 |
|---|---|---|---|
| 705205 | 3/1965 | Canada | 55/503 |
| 979470 | 4/1951 | France | 55/503 |

*Primary Examiner*—C. Scott Bushey
*Attorney, Agent, or Firm*—Cushman Darby & Cushman Intellectual Property Group of Pillsbury Madison & Sutro, LLP

[57] ABSTRACT

An air filter assembly for a pneumatic tool for receiving compressed air through a compressed air supply port from a compressed air supply source, includes: a cylindrical body having at least one air hole therein and an opening at one end thereof, the air hole allowing an inner space to communicate with an outer space; a filter attached to the cylindrical body; a female screw thread part and a male screw thread part for connecting the cylindrical body to the compressed air supply port such that the cylindrical body and the filter attached thereto are set inside the pneumatic tool.

8 Claims, 3 Drawing Sheets

AIR FILTER ASSEMBLY FOR PNEUMATIC TOOL

BACKGROUND OF THE INVENTION

1. Field of the Invention

The invention relates to a pneumatic tool (or compressed air tool), and more specifically, to an air filter unit capable of preventing infiltration of foreign matter into the pneumatic tool.

2. Description of the Related Art

In a pneumatic tool to which compressed air is supplied through a hose from a compressed air supply source such as an air compressor, foreign matter such as sand and dust sometimes infiltrates into a socket when the hose is removed from the socket of the pneumatic tool. If the pneumatic tool with the sand and the like infiltrated into the socket is operated by connecting the hose to the pneumatic tool, the sand and the like may, in some cases, clog a trigger valve or enter into a cylinder to cause such abnormality as defective operation of a piston and the like. Thus, a pneumatic tool with an air filter unit has been proposed in order to prevent the infiltration of foreign matter into an air chamber of the pneumatic tool.

The air filter unit of this pneumatic tool will be described with reference to FIG. 3. FIG. 3 shows a nail gun 1. A body 2 of the nail gun 1 is formed by integrally molding a mechanical part housing 3 and a grip 4. An end cap 5 is fitted into the opening on the end of the hollow grip 4 with a bolt 6. A hose connector plug 8 is attached to a compressed air supply port 7 that is opened through along the center of the end cap 5, so that compressed air is supplied to an air chamber within the body 2 by connecting an air compressor (not shown) to the hose connector plug 8 through a hose.

An air filter 9 is attached to the surface on which the grip 4 comes in contact with the end cap 5 so as to be interposed between the grip 4 and the end cap 5. The air filter 9 has a slightly larger diameter than that of the grip 4 or of the end cap 5. The air filter 9 is formed sheetlike by compressing synthetic fibers or the like, and filters the compressed air flowing into the compressed air supply port 7 before the compressed air is supplied to the air chamber.

In the conventional air filter unit that is formed by attaching the sheetlike air filter within the grip of the pneumatic tool, the air filter covers the entire sectional area of the air chamber within the grip. Therefore, the effective sectional area of the passage is reduced by the air filter, which in turn reduces the air supply rate of the compressed air supply port. As a result, the air pressure recovery time in the continuous operation of the pneumatic tool is increased to impair the operability of the tool.

Further, since the foreign matter entrapped by the air filter deposits within the air chamber between the air filter and the compressed air supply port, it is necessary to remove the end cap from the housing in order to eliminate the foreign matter, making the maintenance of the tool cumbersome.

SUMMARY OF THE INVENTION

The invention has been made in view of the aforementioned circumstances.

An object of the invention is, therefore, to improve the operability of the tool by improving the air supply capacity as much as possible as well as to facilitate the maintenance of the tool.

To achieve the above object, the invention is applied to an air filter assembly for a pneumatic tool that receives compressed air through a hose from a compressed air supply source. In such air filter assembly, an air hole is formed in a cylindrical body, the cylindrical body having at least one end thereof opened, and the air hole allowing an inner space to communicate with an outer space. An air filter unit is formed by attaching to the cylindrical body a wire mesh or a filter such as a filter made of long fibers. Connecting means are formed both at an opening on an air chamber side of a compressed air supply port arranged in the pneumatic tool and at an open end of the air filter unit, the connecting means including a female screw thread part and a male screw thread part, or a bayonet mechanism or the like. The air filter unit is connected to the compressed air supply port so as to be contained within the pneumatic tool.

The air flowing into the compressed air supply port of the pneumatic tool from the hose connected to the air compressor or the like is supplied to the air chamber via the cylindrical air filter unit attached to the inner opening of the compressed air supply port. The air holes are formed in the air filter unit, so that the air having passed through the filter within the air filter unit is jetted out of the air holes with foreign matter such as sand entrapped and therefore purged by the air filter. Since the cylindrical air filter unit is attached to the compressed air supply port, the air filter unit of the invention can reduce increase in passage resistance compared with the air filter unit designed to divide the air chamber into two parts with a filter extending over the entire sectional area of the air chamber in the grip or the like. In addition, the foreign matter, whose infiltration into the air chamber is blocked by the air filter unit, can be taken out through the compressed air supply port.

DETAILED DESCRIPTION OF THE PREFERRED EMBODIMENTS

Figure 1:
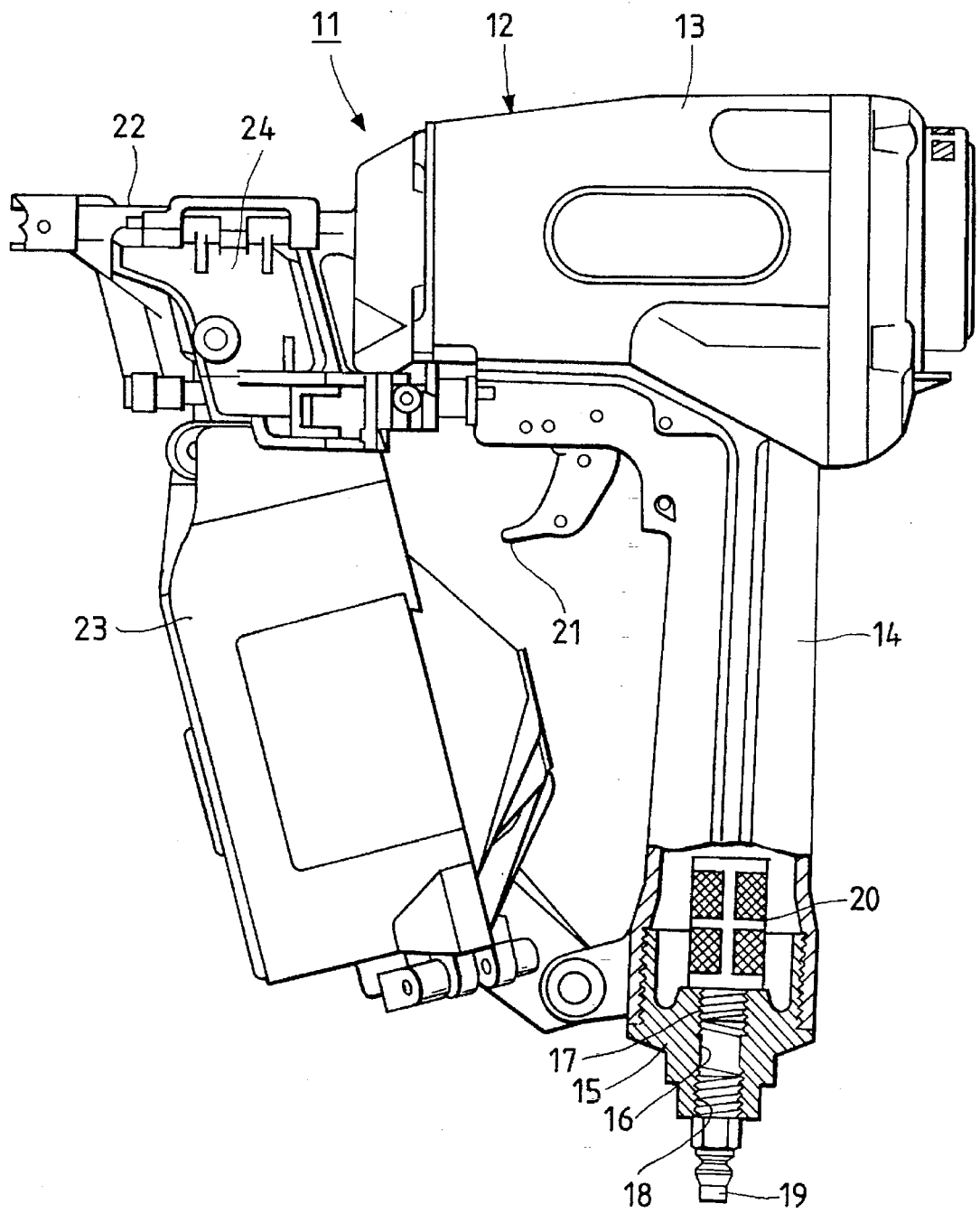
FIG. 1 shows an embodiment of the invention with a partially cutaway side view of a nail gun.

An embodiment of the invention will now be described in detail with reference to FIGS. 1 and 2. FIG. 1 shows a nail gun 11 driven by compressed air. A die-cast body 12 is formed by integrally molding a mechanical part housing 13 and a hollow grip 14. An end cap 15 is fitted into the end of the grip 14. A compressed air supply port 16 runs through the center of the end cap 15 from top and bottom, and female screw threads 17, 18 are formed on both top and bottom openings of the compressed air supply port 16. A hose connector plug 19 is fixedly screwed into the bottom opening, and an air filter unit 20 is screwed into the top opening.

When a hose connector of an air compressor (not shown) is connected to the hose connector plug 19 through a hose and a trigger 21 of the nail gun 11 is thereafter operated, a trigger valve is opened. Then, a main valve within the mechanical part housing 13 is opened to drive an air cylinder. As a result, a nail is injected from a nose 22. The nails are concatenated in beltlike form on a plastic ribbon or wire and accommodated within a nail feeder 23. The nails are supplied to the nose 22 sequentially by a supply mechanism 24.

Figure 2:
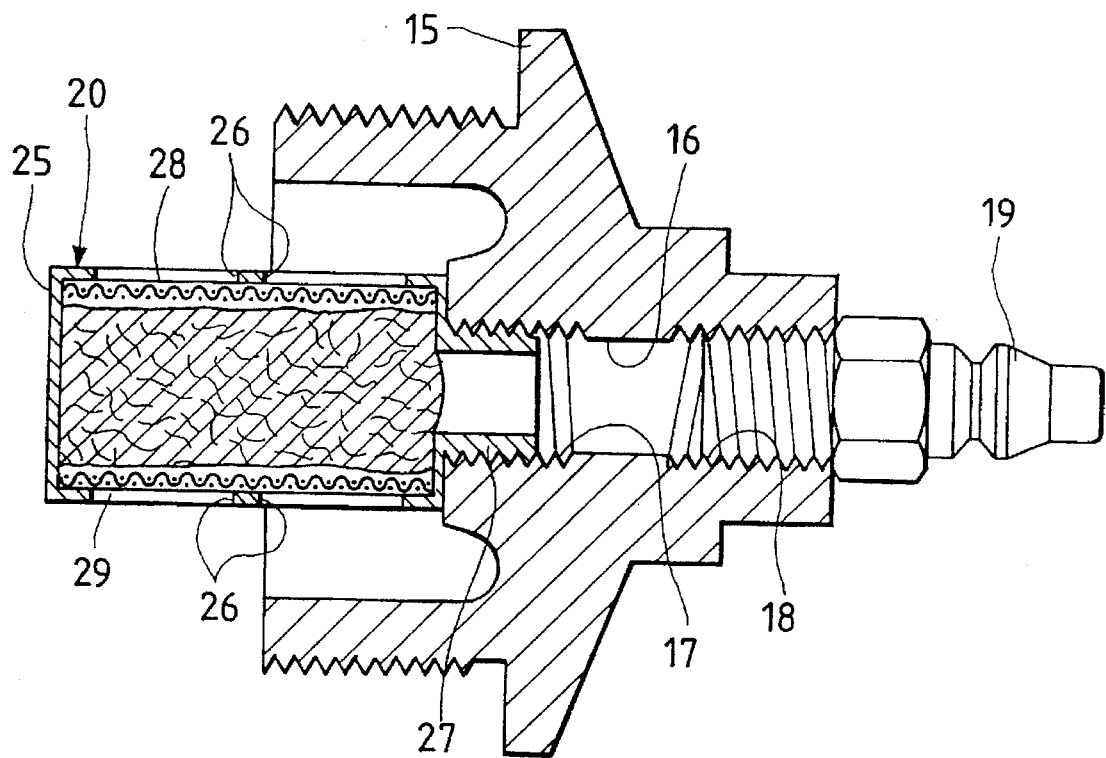
FIG. 2 is a sectional view of an air filter unit of the nail gun shown in FIG. 1.
Figure 3:
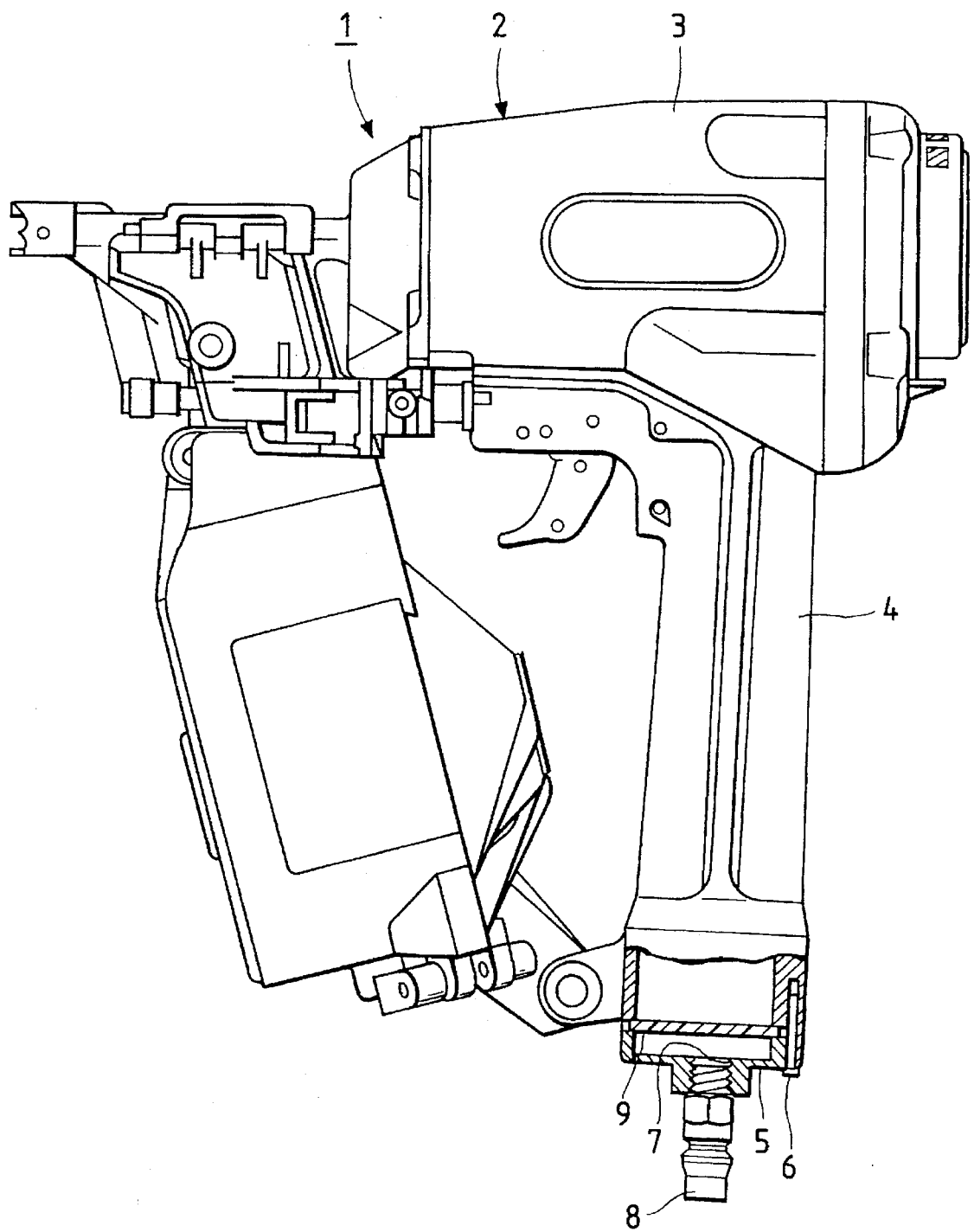
FIG. 3 shows a conventional example with a partially cutaway side view of a nail gun.

FIG. 2 shows the air filter unit 20. An outer casing 25 of the air filter unit 20 that is screwed into the end cap 15 is a hollow cylindrical body molded with resin, and has a plurality of air holes 26 that communicate with the outside. A male screw thread 27 is formed over the outer circumferential surface of an opening on one end and is screwed into the female screw thread 17 of the compressed air supply port 16. A wire mesh 28 is attached to the entire inner circumferential surface of the outer casing 25. The space formed by the wire mesh 28 is loaded with a filter 29 that is made of synthetic fibers or long fibers such as wool. Therefore, compressed air supplied through the hose connector plug 19 is filtered by the filter 29 and the wire mesh 28, allowing foreign matter such as sand that has entered into the hose or the hose connector plug 19 to be entrapped.

Further, when the hose is taken out of the hose connector plug 19 after the nail has been driven, the compressed air within the nail gun 11 is jetted outside through the air filter unit 20 and the hose connector plug 19, allowing most of the dust, sand, and the like entrapped by the filter 29 to be discharged outside along air streams.

Still further, if the dust, sand, and the like have deposited in the vicinity of the inlet of the air filter unit 20, then such dust, sand, and the like can be eliminated through the hose connector plug 19 with the hose removed.

When the air filter unit 20 clogs after having been used for a long period of time, the air filter unit 20 is replaced with a new one by releasing the end cap 15 from the grip 14.

It may be noted that the structure of the air filter unit 20 is not limited to the aforementioned example that is the wire mesh 28 and the filter 29 made of long fibers but that the air filter unit 20 can be made only of finely made slender wire meshes, nylon meshes, or the like.

The embodiments described above use female screw threads 17 and 18, and a male screw thread 27. However, a bayonet mechanism may be employed instead of the screws.

Therefore, various modifications may be made within the technical scope of the invention, and it is to be understood that such modifications are considered to be within the scope and spirit of the invention.

As described in the foregoing in detail, the invention is using a column-shaped air filter unit. Therefore, the filter density can be reduced compared with the conventional sheetlike filter, which in turn contributes to improving the continuous operability of the pneumatic tool by reducing passage resistance. In addition, since the air filter unit is attached to the compressed air supply port, the entrapped foreign matter can be eliminated with ease unlike the conventional example in which the filter is arranged within the air chamber. Also provided are self-purging effects by which the dust and the like within the air filter unit can be discharged outside along the air streams jetting out of the pneumatic tool at the time the hose is removed from the connector. These effects contribute to an improvement in the durability of the air filter unit, which is also one of a variety of advantages that can be provided by the invention.

What is claimed is:

1. An air filter assembly for a pneumatic tool for receiving compressed air through a compressed air supply port from a compressed air supply source, said air filter assembly comprising:

a cylindrical body having at least one air hole in a cylindrical side wall thereof and an opening at one end thereof, said air hole allowing an inner space to communicate with an outer space;

a filter attached to said cylindrical body;

means for mechanically connecting said cylindrical body to the compressed air supply port such that said cylindrical body and said filter attached thereto are set inside the pneumatic tool;

wherein said air filter assembly is constructed and arranged so that upon said placement of said cylindrical body inside the pneumatic tool, a gap is defined between said cylindrical side wall and an inner wall of said pneumatic tool whereby air can pass through said at least one air hole.

2. An air filter assembly according to claim 1, wherein said filter comprises a wire mesh.

3. An air filter assembly according to claim 1, wherein said filter is made of long fibers.

4. An air filter assembly according to claim 1, wherein said connecting means comprises a female screw thread part and a male screw thread part.

5. An air filter assembly according to claim 1, wherein said connecting means comprises a female part and a male part.

6. An air filter assembly according to claim 1, wherein said cylindrical body has a hollow cylindrical portion made of resin.

7. An air filter assembly according to claim 1, further comprising an end cap to which said cylindrical body is attached, wherein said filter assembly is detachable as one unit from the pneumatic tool.

8. An air filter assembly according to claim 1, wherein said connecting means comprises a male screw thread part on the cylindrical body and a female screw thread part on the air supply port.

* * * * *